J. VAN BEEK.
BEET HARVESTER.
APPLICATION FILED APR. 17, 1917.
1,288,300.
Patented Dec. 17, 1918.
2 SHEETS—SHEET 1.
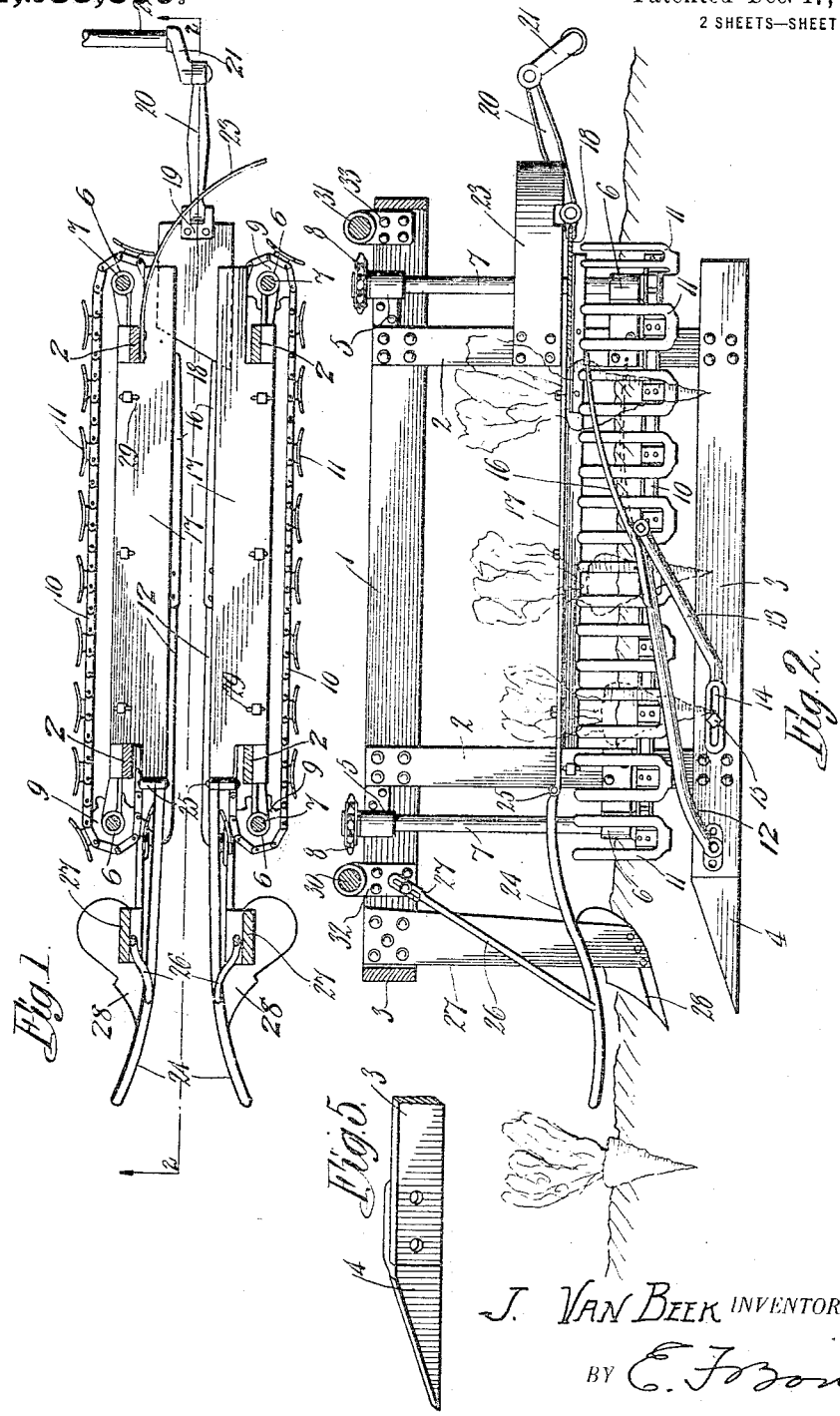
J. VAN BEEK INVENTOR.
BY E. F. Bond
his ATTORNEY.

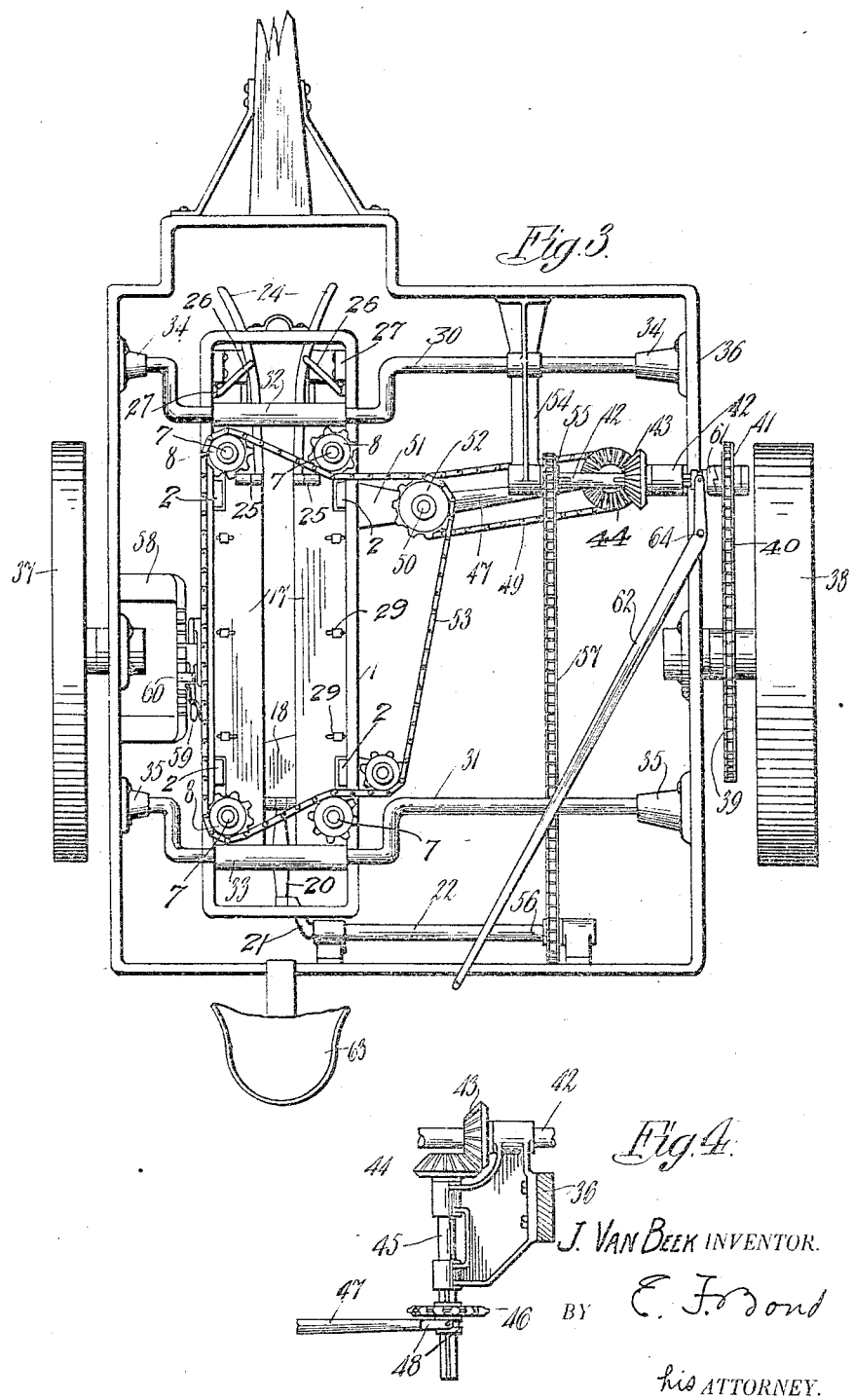

UNITED STATES PATENT OFFICE.

JOSEPH VAN BEEK, OF GREEN BAY, WISCONSIN.

BEET-HARVESTER.

1,288,300. Specification of Letters Patent. Patented Dec. 17, 1918.

Application filed April 17, 1917. Serial No. 162,615.

*To all whom it may concern:*

Be it known that I, JOSEPH VAN BEEK, a citizen of the United States of America, residing at Green Bay, in the county of Brown and State of Wisconsin, have invented certain new and useful Improvements in Beet-Harvesters, of which the following is a specification, reference being had therein to the accompanying drawing.

The invention relates to a beet harvester, and its principal object consists therein to provide a machine of the character specified whereby the beets are pulled out of the ground, topped and discharged.

Another object constitutes the provision of novel means for conveying the beets to the topping device.

A further object embraces the means for gradually pulling out the beets from the ground.

Other objects will become apparent by reference to the specification and the claims forming part thereof.

In the accompanying drawings,

Figure 1 is a plan view of a portion of an auxiliary frame of the machine containing the operative elements.

Fig. 2 is a longitudinal sectional view of the frame, the section being taken on line 2—2 of Fig. 1.

Fig. 3 is a top plan view of the entire machine.

Fig. 4 is a detail view of driving connections, and

Fig. 5 is a fragmentary perspective view of one of the runner bars and its detachable point.

Referring to the drawing, 1 designates a rectangular auxiliary frame suitably supported, and from which the operative parts of the machine are suspended. A plurality of hanger bars 2 are secured to the longitudinal members of the frame 1 and are fastened at their lower ends to runner bars 3 at the forward end of which removable points 4 are arranged, which may be detached and sharpened whenever such occasion arises.

At the upper and lower ends of the hanger bars 2, journal bearings 5 and 6 are secured and receive shafts 7, carrying at their upper end sprocket wheels 8 and at their lower end sprocket wheels 9. Conveyer chains 10 are trained around the sprocket wheels 9 and are equipped with a plurality of U-shaped members 11, of which the transverse portions are slightly below the chain, while the forked portions extend vertically a suitable distance above the chain. The U-members 11 are slightly curved, as is obvious from Fig. 1, to fit the form of the beets. The chains 10, as is obvious from Fig. 1, are spaced apart a distance sufficient to permit the beets to be lifted out and conveyed, and the U-shaped members 11 aid the chains in this function. It is of course necessary that the opposite inner runs of the chains be driven in the same direction and provision therefor must be made in rotating the drive wheels 8 which impart rotation to the wheels 9 and chains 10. The runner bars 3 are equipped with elevating or lifting members 12 pivoted at their forward ends to said runners, and at their rear ends to adjusting rods 13, the lower end of which is slotted, as at 14, for passage of the bolt 15, extending through the runner bar 3. Thus the slope of bar 12 may be varied by loosening bolt 15 and shifting the rod 13.

Leaf springs 16 secured to the member 12 form an extension thereof and are depressed into the position indicated in dotted lines in Fig. 2 under the weight of a rearwardly sliding beet. The upward pressure of the spring serves to steady the beet and to prevent its being displaced forwardly during the topping operation as hereinafter further specified. The elevating members 12 and the springs cause the tops of the beets to enter in engagement with the underside of a number of spaced plates 17, and in this position the beets are topped by a reciprocating knife 18. The latter is secured as at 19, to a pitman 20, connected at its other end to a crank 21 of the shaft 22. The tops of the beets are passed on over the free ends of the springs and are guided to one side of the machine by a deflecting plate 23.

A number of forwardly extending rods 24 hinged at 25, to the plates 17 are adjustably secured to the frame by rods 26, which at the upper end are slotted and are secured in adjusted position by bolts 27. The rods 24 serve the purpose of gathering the leaves or foliage of the beets and guide the same in between the spaced plates 17, so as to insure proper conveyance of the pulled out beets. Adjacent to the forward end of the longitudinal members of the frame 1, arms 27 are secured at the lower end of which a plow 28 is fastened adapted to dig up a furrow at each side of a row of beets, so as to allow the chains 10 and attachments 11 to operate below the surface of the ground. The plates 17 are provided with transverse slots 29 so as to permit adjustment of the plates 17 with respect to each other.

Referring especially to Fig. 3 it will be apparent that the auxiliary frame 1 is suspended from a pair of crank shafts 30 and 31, which are journaled in bearings 32 and 33 of the auxiliary frame 1. The terminal portions of the crank shafts 30 and 31 enter boxes 34 and 35, secured on the inner sides of the longitudinal members of the main frame 36. The main frame 36 is supported by running wheels 37 and 38, the latter being provided on its hub with a sprocket wheel 39 around which and a registering sprocket 41 on a shaft 42 a chain 40 is trained. A beveled gear 43 of said shaft meshes with a beveled gear 44 keyed to a shaft 45. A sliding sprocket 46 is splined to the shaft 45 and an arm 47 secured to the bracket 51 which is supported by the auxiliary frame engages with the forked end 48 of the hub of the sprocket wheel which is provided with a circular groove, so as to be raised and lowered in accordance with vertical adjustments of the auxiliary frame 1. A chain 49 is trained around the sprocket 46 and around a sprocket mounted on an upright shaft 50, which is carried by a bracket 51, forming bearings for said upright shaft. A sprocket 52 at the upper end of the upright shaft 50 is engaged by a chain 53, which is trained around the sprocket wheels 8 of the upright shaft 7, which at the lower end are provided with the sprockets 9 and the chains 10. It is obvious from Fig. 3 that the sprocket chain 53 is so trained around the several sprocket wheels 8 that the wheels 8 on one side of the auxiliary frame are revolving in one direction, while the wheels on the other side of the frame revolve in opposite direction. The shaft 42 is provided near its inner end where it is carried by the bearing 54 with a sprocket wheel 55. This sprocket wheel is in registry with a sprocket wheel 56 on the shaft 22, which is connected by means of the crank 21 and the pitman 20 with the reciprocating knife 18.

A chain 57 is trained around the wheels 55 and 56, so that continuous drive is imparted to the shaft 22 to effect reciprocation of the cutting knife. A quadrant 58 is secured to the main frame and serves as a locking means for a lever 59 secured to the auxiliary frame 1. A spring pressed pawl 60 of said lever enters a notch of the quadrant 58, so that the entire auxiliary frame together with its operative parts may be raised clear off the ground or may be adjusted in vertical direction to meet special requirements. A clutch lever 62 extending into the vicinity of the driver's seat 63 and pivoted at the main frame, as at 64, permits throwing in or out of the drive to the shaft 42.

The operation of the machine is as follows: When the machine is arranged in proper position with respect to a row of beets the lever 59 is manipulated so as to lower the auxiliary frame 1, whereby the runner bars 3 and the plows 28 are placed in proper position depending upon the conditions of the soil and the average length of the beets to be harvested. In the operation of the machine the plows form narrow furrows in front of the conveyer chains 10 and the runner bars 3 together with their points 4 loosen the soil at each side of the beets. Simultaneously the lifter rods 12 exercise an upwardly directed pressure upon the beets which thus are forced to slide up on the bars until the beets are seized by the springs 16 which cause the latter to engage with the underside of the spaced plates 17. The chains 10 engage the beets with their U-shaped members 11 outside of the lifter rods 12, and thus insure proper conveyance of the beets. Subsequently the leaves of the beets projecting through the spaces between the plates 17 are severed by the reciprocating knife 18, and the tops are discharged to one side of the machine by the deflecting plate 23.

While the drawings show the preferred embodiment of the invention, it is not my intention to confine myself strictly to the details as shown, but I want to avail myself of any changes, alterations and modifications which constitute departures within the scope of the invention as specifically pointed out in the appended claims.

I claim:

1. In a machine of the kind described, a frame, runner bars secured to said frame and adapted to move in the ground, lifting bars secured to said runner bars, means for adjusting said lifting bars, a pair of spaced plates arranged above said runner bars, means for pressing the beets in engagement with said plates, conveyer chains for carrying the beets rearwardly in upright position and means for topping the beets.

2. In a machine of the kind described, a frame, runner bars secured to said frame and adapted to move in the ground, lifting bars secured to said runner bars, means for adjusting said lifting bars, a pair of spaced plates arranged above said runner bars, resilient means for pressing the beets in engagement with said plates, conveyer chains for carrying the beets rearwardly in upright position and means for topping the beets.

3. In a machine of the kind described, a frame, runner bars on said frame adapted to move in the ground, lifter rods adjustably mounted on said runner bars and adapted to lift the beets out of the ground, springs forming the extension of said lifter rods, a pair of spaced plates above said lifter rods and forming an abutment for the beets raised by said springs, a topping device, and conveyer chains for delivering the beets in upright position to said topping device.

4. In a machine of the kind described, a frame, runner bars secured to said frame and adapted to move in the ground, lifter rods adapted to lift the beets out of the ground, conveyer chains moving in the ground and adapted to carry the beets rearwardly, members on said chains for securely holding the beets, means for removing the soil to clear the path for said chains, a pair of spaced plates above said chains forming a guiding means for the beets, and a reciprocating device above the rear end of said chains to top the beets.

5. In a machine of the kind described, a frame, runner bars secured to said frame and adapted to move in the ground, lifter rods adapted to lift the beets out of the ground, means for adjusting the lifter rods, springs forming the extension of said lifter rods, a pair of spaced plates above said runner bars forming an abutment for the beets when raised by said springs, means for guiding the foliage of the beets into the space between said plates, conveyer chains moving in the ground and adapted to carry the beets rearwardly in upright position, members on said chains for securely holding the beets, means for removing the soil to clear the path for said chains, means for guiding the beets, and a reciprocating device above the rear end of said chains to top the beets.

In testimony whereof I hereunto affix my signature.

JOSEPH VAN BEEK.

Copies of this patent may be obtained for five cents each, by addressing the "Commissioner of Patents, Washington, D. C."